Patented Feb. 20, 1940

2,190,770

UNITED STATES PATENT OFFICE 2,190,770

SYNTHETIC LINEAR POLYAMIDES

Wallace H. Carothers, Wilmington, Del., assignor to E. I. du Pont de Nemours & Company, Wilmington, Del., a corporation of Delaware No Drawing. Application April 16, 1936, Serial No. 74,811

10 Claims. (Cl. 260—13)

This invention relates to new compositions of matter, and more particularly to synthetic linear condensation superpolyamides.

The present application is a continuation-in-part of my application Serial Number 34,477, filed August 2, 1935, which in turn is a continuation-in-part of application Serial Number 181, filed January 2, 1935, and Patent Number 2,071,250.

Products obtained by the mutual reaction of certain dibasic carboxylic acids and certain organic diamines have in the past been described by various investigators. For the most part, these products have been cyclic amides of low molecular weight. In a few cases they have been supposed to be polymeric, but they have been then either of low molecular weight or completely infusible and insoluble. In all cases, they have been devoid of any known utility. These statements may be illustrated by the following citations: Ann. 232, 227 (1886); Ber. 46, 2504 (1913); Ber. 5, 247 (1872); Ber. 17, 137 (1884); Ber. 27 R, 403 (1894); Ann. 347, 17 (1906); Ann. 392, 92 (1912); J. A. C. S. 47, 2614 (1925). Insofar as I am aware, the prior art on synthetic polyamide fibers, and on polyamides capable of being drawn into useful fibers, is non-existent.

This invention has as an object the preparation of new fiber-forming materials. A further object is the manufacture of useful fibers. Still further objects are chemical processes for making useful fiber-forming polyamides (i. e. superpolyamides) and physical methods for making fibers therefrom. These and other objects, which will be apparent as the description proceeds, are accomplished by reacting together a primary or secondary diamine (described comprehensively as a diamine having at least one hydrogen attached to each nitrogen) and either a dicarboxylic acid or an amide-forming derivative of a dibasic carboxylic acid, until a product is formed which can be drawn into a continuous oriented fiber. The fibers are prepared by spinning under various conditions, orientation being secured by a process, to be described more fully hereinafter, which is termed "cold-drawing." The latter process is conveniently made an integral part of the spinning operation.

The term "synthetic" is used herein to imply that the superpolyamide molecules are built up by a wholly artificial process and not by any natural process. In other words, my original reactants are always monomeric substances.

The term "linear" as used herein implies only those polyamides obtainable from bifunctional reactants. The structural units of such products are linked end-to-end and in chain-like fashion. The term is intended to exclude three-dimensional polymeric structures, such as those that might be present in polymers derived from triamines or from tribasic acids.

The term "polyamide" is used to indicate a polymer containing a plurality of amide linkages. In the linear condensation polyamides of this invention the amide-linkages appear in the chain of atoms which make up the polymer.

The terms "fiber-forming polyamide" and "superpolyamide" are used to indicate that my products are capable of being formed directly, i. e., without further polymerization treatment, into useful fibers. As will be more fully shown hereinafter, fiber-forming polyamides are highly polymerized products and appear to exhibit crystallinity in the massive state.

The expression "dibasic carboxylic acid" is used to include carbonic acid and dicarboxylic acids. By "amide-forming derivatives of dibasic carboxylic acids" I mean those materials such as anhydrides, amides, acid halides, half esters, and diesters, which are known to form amides when reacted with a primary or secondary amine.

The following discussion will make clear the nature of this invention and the meaning of the above and other terms used hereinafter. If a dicarboxylic acid and a diamine are heated together under such conditions as to permit amide formation, it can readily be seen that the reaction might proceed in such a way as to yield a linear polyamide

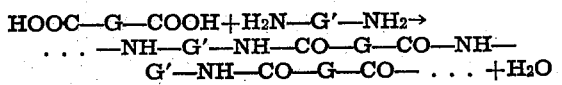

The indicated formula, in which G and G' represent divalent hydrocarbon radicals, represents the product as being composed of long chains built up from a series of identical units

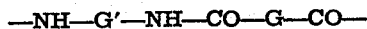

This unit, derived from one molecule each of acid and diamine, may be called the "structural unit." It will be convenient to refer to the number of atoms in the chain of this unit as the "unit length." The expression "radical of a dibasic carboxylic acid" is taken to mean that fragment or divalent radical remaining after the two acidic hydroxyls have been removed from its formula. Thus the radical of carbonic acid is —CO—; the radical of adipic acid is

—CO—CH₂—CH₂—CH₂—CH₂—CO— the expression "radical of a diamine" indicates the divalent radical or fragment remaining after one hydrogen has been removed from each amino group. Thus the radical of pentamethylenediamine is

—NH—CH₂—CH₂—CH₂—CH₂—CH₂—NH—

The "radical length" is, in the case of both acid and amine, the number of atoms in the chain of the radical. Thus the radical length of carbonic acid is 1; that of adipic acid is 6; and that of pentamethylenediamine is 7. The term "unit length", referred to above, obviously means the sum of the radical lengths of the diamine and the acid.

As a specific illustration, reference may be made to the superpolyamide derived from sebacic acid and pentamethylenediamine. Its structural formula may in part be represented as

... NH(CH₂)₅NHCO(CH₂)₈CO—
        NH(CH₂)₅NHCO(CH₂)₈CO— ...

The structural unit is

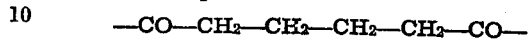

and the unit length as indicated by the numbered atoms is 17.

As previously mentioned, my superpolyamides can be prepared by reacting diamines with dicarboxylic acids or amide-forming derivatives of dibasic carboxylic acids, of which the most suitable are the diesters with volatile monohydric alcohols or phenols. The diamines suitable for the practice of my invention are those having at least one hydrogen attached to each of the nitrogen atoms. In other words, I may use di-primary amines, primary-secondary amines, or di-secondary amines, but never a diamine in which either amino group is teritiary. Of all these types of amines, the di-primary amines are in the great majority of instances far more satisfactory because of their greater reactivity. Within the field of di-primary amines, the aliphatic amines are most suitable for the ready preparation of superpolyamides capable of being drawn into the highest quality fibers. By aliphatic diamine as used herein is meant a diamine in which the nitrogens are attached to aliphatic carbons, (i. e. carbon atoms which are not a part of an aromatic ring). Mixtures of diamines of any of the mentioned operable types may also be used. Superpolyamides may also be prepared from one or more diamines and (a) mixtures of different dicarboxylic acids (b) mixtures of amide-forming derivatives of different dibasic carboxylic acids (c) mixtures of dicarboxylic acids and/or amide-forming derivatives of dibasic carboxylic acids with one or more monoaminomonocarboxylic acids or amide-forming derivatives thereof.

While the products of my invention can be prepared from a wide variety of diamines and dicarboxylic acids or amide-forming derivatives of dibasic carboxylic acids. I have found that a preferred selection of amine and acid is that in which the sum of the radical lengths is at least 9. Such a pair of reactants has very little if any tendency to form low molecular weight cyclic amides, and the polyamides therefrom are more generally soluble or fusible, one of these properties being necessary for spinning. I have, however, met with some success in preparing superpolyamides from amines and acids the sum of whose radical lengths is less than 9. As an example of superpolyamide having a relatively short structural unit may be mentioned that from pentamethylenediamine and dibutyl carbonate.

Examples of dicarboxylic acids and diamines which may be used in the practice of my invention are given in the following table:

TABLE I

| Radical length | Dicarboxylic acids |
| --- | --- |
| 3 | HO₂CCH₂CO₂H malonic. |
| 5 | HO₂CCH₂CH₂CH₂CO₂H glutaric. |
| 5 | HO₂CCH₂CH(CH₃)CH₂CO₂H methyl glutaric. |
| 6 | HO₂C(CH₂)₄CO₂H adipic. |
| 7 | HO₂C(CH₂)₅CO₂H pimelic. |
| 8 | HO₂C(CH₂)₆CO₂H suberic. |
| 9 | HO₂C(CH₂)₇CO₂H azelaic. |
| 10 | HO₂C(CH₂)₈CO₂H sebacic. |
| 13 | HO₂C(CH₂)₁₁CO₂H brassylic. |
| 14 | HO₂C(CH₂)₁₂CO₂H tetradecanedioic. |
| 18 | HO₂C(CH₂)₁₆CO₂H octadecanedioic. |
| 8 | HO₂CCH₂C₆H₄CH₂CO₂H p-phenylene diacetic. |

| | Diamines |
| --- | --- |
| 6 | NH₂(CH₂)₄NH₂ tetramethylene. |
| 7 | NH₂(CH₂)₅NH₂ pentamethylene. |
| 8 | NH₂(CH₂)₆NH₂ hexamethylene. |
| 8 | NH₂CH₂CH₂CH(CH₃)CH₂CH₂CH₂NH₂ methyl hexamethylene. |
| 12 | NH₂(CH₂)₁₀NH₂ decamethylene. |
| 15 | NH₂(CH₂)₁₃NH₂ tridecamethylene. |
| 20 | NH₂(CH₂)₁₈NH₂ octadecamethylene. |
| 8 | NH₂CH₂C₆H₄CH₂NH₂ p-xylylene. |

It has been indicated that polyamides having a unit length of at least nine are most easily obtained in the superpolymeric form. Of the superpolyamides having a unit length of at least nine, a very useful group from the standpoint of fiber qualities are those derived from diamines of formula NH₂CH₂RCH₂NH₂ and dicarboxylic acids of formula HOOCCH₂R'CH₂COOH in which R and R' are divalent hydrocarbon radicals free from olefinic or acetylenic unsaturation (i. e., non-benzenoid unsaturation) and in which R has a chain length of at least two carbon atoms. The R and R' may be aliphatic, alicyclic, aromatic, or araliphatic radicals. Of this group of superpolyamides, those in which R is $(CH_2)_x$ and R' is $(CH_2)_y$ where $x$ and $y$ are integers and $x$ is at least two, are especially useful from the standpoint of spinnability and fiber qualities. They are easily obtained at an appropriate viscosity for spinning and have a type of crystallinity which enables them to be cold drawn with especial facility. As valuable members of this class may be mentioned polypentamethylene adipamide, polyhexamethylene adipamide, polyoctamethylene adipamide, polydecamethylene adipamide, polypentamethylene suberamide, polyhexamethylene suberamide, polydecamethylene suberamide, polypentamethylene sebacamide, polyhexamethylene sebacamide, and polyoctamethylene sebacamide.

In the practice of this invention a diamine is reacted with a dicarboxylic acid or an amide-forming derivative of a dibasic carboxylic acid such as an alkyl ester, an aryl ester, an acid halide, an amide, or the anhydride. The preferred methods involve the use of the acid or its dialkyl or diaryl ester, and the most effective operating conditions will depend in part on the choice of the reactants used. The acid or its ester may be illustrated by the general formula AOOCGCOOA where A stands for hydrogen or a hydrocarbon radical. A primary step in the reaction of this compound with the diamine NH₂G'NH₂ might be indicated by the equation:

NH₂G'NH₂+AOOCGCOOA→
                      NH₂G'NHCOGCOOA+AOH

The progress of the reaction depends upon the elimination of the hydroxyl compound (water, alcohol, or phenol). This primary product is capable in a second step of reacting with itself with the elimination of AOH yielding another product molecule twice as long, or, since one end of the primary molecule bears an NH₂ group, it may react with another molecule of AOOCGCOOA, while the COOA end of the primary molecule may react with another molecule of the amine. It is evident then that by a series of steps the length of the product polyamide molecule will gradually increase and the same reactants will furnish structurally similar polyamide molecules of different lengths depending upon the extent to which the reaction has been carried. In practice it is in general not possible to distinguish or isolate the possible separate steps (except perhaps the very earliest ones); nevertheless, the average length of the product molecules will in fact depend upon the degree of completeness of the reaction, and is superpolyamides are desired it is necessary to adopt such conditions of time, temperature, pressure, and catalysis as will insure a relatively high degree of completeness of reaction.

Another factor of considerable importance is the ratio of dibasic acid or amide-forming derivative thereof to the diamine initially and at various stages of the reaction. If a very large excess of diamine is used, the product will consist preponderantly of NH₂G'NHCOGCONHG'NH₂. Since this material contains only one structural unit, it must be regarded as a monomeric, not a polymeric, product. Similarly, if a large excess of acid is used, the preponderant product will be a short molecule bearing acid groups at each end. If the product molecule is to be exceedingly long, it must, of course, be derived from almost exactly equivalent amounts of acid and amine. This does not mean that it will be absolutely necessary to have the amine and acid (or amide-forming derivative) present in exactly equivalent amounts initially in order finally to obtain molecules of very great length. A part of the excess diamine or acid may be eliminated by volatilization or otherwise during the course of the reaction so that the ratio of the radicals derived from the two reactants is almost exactly equivalent in the final product. However, as shown in Example IIId and IIIe an excess of either diamine or dibasic acid amounting to as much as 5% (molar) may be used in producing a spinnable polymer. The relative excess of diamine or dibasic acid will, in general, determine the nature of the end groups in the final product. When the end groups of the polymer molecules are all alike, i. e., entirely carboxyl or entirely amino groups, the polymer cannot undergo further polymerization. Such products are "viscosity stable", that is to say, they do not undergo appreciable viscosity change on being heated at their melting point (e. g. 200–275° C.) for several hours. This is a very desirable property if the product is to be spun into fibers from melt, since it makes possible the preparation of uniform filaments from large batches of molten polymer without altering conditions, e. g., temperature and pressure, during the spinning operation. The excess reactant to be used in making these viscosity stable polymers is not as a rule less than 0.1 molar percent.

The first reaction which occurs when a diamine and a dicarboxylic acid are mixed and brought into sufficiently intimate contact is the formation of the diamine-dicarboxylic acid salt. Such salts are generally solids and since their tendency to dissociate into their components is relatively low, both the acid and amine are fixed. The mixture can therefore be subjected intermediately to heat in an open vessel without danger of losing amine or acid and so disturbing the balance in the proportion of reactants. Frequently, however, it is advantageous to isolate the salt and purify it prior to conversion into the polyamide. The preparation of the salts affords an automatic means for adjusting the amine and acid reactants to substantial equivalency and it avoids the difficulty attendant upon the preservation of the isolated amines in the state of purity. It ends to eliminate impurities present in the original diamine and dicarboxylic acid.

A convenient method of preparing these salts consists in mixing approximately chemically equivalent amounts of the diamine and the dicarboxylic acid in a liquid which is a poor solvent for the resultant salt. The salt which separates from the liquid can then be purified, if desired, by crystallization from a suitable solvent. The salts are crystalline and have definite melting points. They are, as a rule, soluble in water and may conveniently be crystallized from certain alcohols and alcohol-water mixtures. They are relatively insoluble in acetone, benzene, and ether.

The preparation of superpolyamides from the diamine-dicarboxylic acid salts can be carried out in a number of ways. The salt may be heated in the absence of a solvent or diluent (fusion method) to reaction temperature (usually 180–300° C.) preferably under conditions which permit the removal of the water formed in the reaction, until examination of the test portion indicates that the product has good fiber-forming qualities. A simple test consists in touching the molten polymer with a rod and drawing it away; if the superpolymeric stage has been reached, a continuous filament of considerable strength and pliability is formed. A more useful test, more fully described hereinafter, is based on the determination of the intrinsic viscosity of the polymer. Another procedure for preparing superpolymers consists in heating a salt in an inert solvent for the polymer, preferably a monohydric phenol such as phenol, m-cresol, o-cresol, p-cresol, xylenol, p-butyl phenol, thymol, and o-hydroxydiphenyl. With the solvents may be associated, if desired, non-solvents which are non-reactive, such as hydrocarbons, chlorinated hydrocarbons. etc. When the solvent method is used, it is convenient to have a viscometer in the reaction mixture so that the course of the reaction can be followed. The viscosity of the mixture increases as polymerization proceeds. When the reaction has proceeded far enough to give a polymer of good fiber-forming qualities, the mixture can be removed from the reaction vessel and used as such (e. g., for spinning from solution) or the polymer can be separated from the solvent by precipitation, i. e., by mixing with a non-solvent for the polymer such as alcohol, ethyl acetate, or a mixture of the two. Still another method of preparation consists in heating the salt in the presence of an inert non-solvent for the polymer (generally a non-solvent for the salt also) such as high boiling hydrocarbons of which white medicinal oil may be mentioned. An advantage which this method has over the solution method is that it eliminates the step of removing the solvent which is required when the product is to be spun from melt. In contrast to the fusion method, the use of a solvent or of a non-solvent diluent prevents local overheating and insures the formation of a homogeneous product of good color. The fusion method of preparation, however, is usually very satisfactory. The above methods can also be applied directly to the diamine and dicarboxylic acid without first isolating the salt.

In place of using the diamine and dicarboxylic acid (or the salt), a diamine and an amide-forming derivative of a dibasic carboxylic acid may be used in the preparation of the superpolyamide. The reaction may be carried out in the absence of a solvent, in the presence of a solvent, in the presence of a diluent which is not a solvent for the polymer, or in the presence of a mixture of solvent and diluent. The reaction conditions, as indicated in my co-pending application Serial Number 181, differ somewhat with the nature of the amide-forming derivative used. For example, the esters of dibasic carboxylic acids, and particularly the aryl esters, react with diamines at a lower temperature than do the acids themselves.

The temperatures required in the preparation of superpolyamides will vary somewhat with the nature of the amine and the acid or amide-forming derivative thereof which are used. In general, the final temperature will be above 180° C., and it may lie as high as 270–300° C. The time and pressure required in the final stage to produce a polymer suitable for spinning will depend in part on the size of the batch and in part on the amount of surface it presents. Low pressures are by no means necessary. As is shown in Example IIIc, the final stage of the reaction can be carried out quite successfully at atmospheric pressure since even under these conditions at 230° C. the distillation of water is sufficiently rapid and complete. Increased pressure may also be used, as shown in Example IX. The final stages of the reaction may also be hastened by stirring the reaction mixture or by bubbling through it or passing over it an inert gas such as nitrogen (cf. Example IIIa). A factor that must be kept in mind, however, is that the final reaction mass conducts heat very slowly and if local cooling takes place in the interior of the mass, solid particles or lumps will tend to separate causing incomplete reaction. For this reason, if a gas is passed through the reaction mixture it may advantageously be preheated.

The superpolyamides of this invention compared with most organic compounds are unusually resistant to oxidation. Nevertheless, at the high temperatures used in the preparation (e. g. 220° C.) they show a strong tendency to become discolored in the presence of air. For this reason, it is desirable to exclude air or to limit the access of air during their preparation. This may be done by operating in a closed vessel during the early stages of the reaction, or, if an open vessel is used, by providing a stream of inert gas. It is helpful in some cases to add antioxidants to the reaction mixture, especially antioxidants such as syringic acid that show very little inherent tendency to discolor.

In general, no added catalysts are required in the above described processes of the present invention. It should be mentioned, however, that the surface of the reaction vessel (e. g., glass) appears to exercise a certain degree of catalytic function in many cases. The use of added catalysts sometimes confers additional advantages. Examples of such materials are inorganic materials of alkaline reaction such as oxides and carbonates, and acidic materials such as halogen salts of polyvalent metals, for example, stannous chloride.

The superpolyamides can be prepared in the reactors constructed of or lined with glass, porcelain, enamel, silver, gold tantalum, platinum, palladium, rhodium, alloys of platinum with palladium and/or rhodium, chromium plated metals, and chromium containing ferrous metals, including chromium-nickel steels. In order to obtain light-colored products it is generally necessary to carry out the reaction in the substantial absence of oxygen. When reactors of silver, chromium plated metals, or chromium containing ferrous metals are used, the reaction should be carried out in the complete absence of oxygen if light-colored products are desired. This means that if commercial nitrogen is passed through the reaction mixture it should be washed free of oxygen.

From the foregoing description it will be clear that the superpolyamides of this invention derived from a given diamine and a given dicarboxylic acid or amide-forming derivative of a dibasic carboxylic acid will in general comprise a series of individuals of closely similar structure. The average size of these individuals, i. e., the average molecular weight of the polymer, is subject to deliberate control within certain limits; the further the reaction has progressed the higher the average molecular weight will be. The properties of a given polyamide will therefore vary over a considerable range, depending upon its molecular weight (and in part on the nature of its terminal groups). The average molecular weights of the superpolyamides of this invention are very difficult to determine on account of their limited solubility in suitable solvents. A precise knowledge of average molecular weights is, however, not important for the purposes of this invention. In a rough way it may be said that two stages or degrees of polymerization exist: low polymers whose molecular weights probably lie in the neighborhood of 1000 to 4000, and superpolyamides whose molecular weights probably lie in the neighborhood of 7000 to 20,000. Practically the most important distinction between the two types is that the superpolyamides are readily spun into strong, continuous, pliable, permanently oriented fibers, while this property is lacking in the low polymers.

Two of the most characteristic properties of the polyamides of this invention are their high melting points and low solubilities. Those derived from the simpler types of amines and acids are almost invariably opaque solids that melt or become transparent at a fairly definite temperature. Below their melting points the superpolyamides of this invention when examined by X-rays generally furnish sharp X-ray crystalline powder diffraction patterns, which is evidence of their crystalline structure in the massive state. Densities of these polyamides generally lie between 1.0 and 1.1. Typical melting points are shown in Table II. All of the superpolyamides in this table are capable of being spun into continuous filaments.

TABLE II

*Approximate melting points of some superpolyamides*

| Superpolyamide derived from— | M. P., °C. |
|---|---|
| Ethylenediamine and sebacic acid | 254 |
| Tetramethylenediamine and azelaic acid | 223 |
| Tetramethylenediamine and sebacic acid | 239 |
| Tetramethylenediamine and undecandioic acid | 208 |
| Tetramethylenediamine and adipic acid | 278 |
| Tetramethylenediamine and suberic acid | 250 |
| Pentamethylenediamine and malonic acid | 191 |
| Pentamethylenediamine and glutaric acid | 198 |
| Pentamethylenediamine and adipic acid | 223 |
| Pentamethylenediamine and pimelic acid | 183 |
| Pentamethylenediamine and suberic acid | 202 |
| Pentamethylenediamine and azelaic acid | 178 |
| Pentamethylenediamine and undecandioic acid | 173 |
| Pentamethylenediamine and brassylic acid | 176 |
| Pentamethylenediamine and tetradecanedioic acid | 170 |
| Pentamethylenediamine and octadecanedioic acid | 167 |
| Hexamethylenediamine and sebacic acid | 209 |
| Hexamethylenediamine and beta-methyl adipic acid | 216 |
| Octamethylenediamine and adipic acid | 235 |
| Octamethylenediamine and sebacic acid | 197 |
| Decamethylenediamine and carbonic acid | 200 |
| Decamethylenediamine and oxalic acid | 229 |
| Decamethylenediamine and sebacic acid | 194 |
| Decamethylenediamine and para-phenylene diacetic acid | 242 |
| Para-xylylenediamine and sebacic acid | 268 |

The melting points are dependent to some extent upon the heating schedule used and the conditions of thermal contact, but when carried out by the same operator under the same conditions they are fairly sharp and reproducible. The melting points indicated in the table were determined by placing fine particles of the polyamide on a heated metal block in the presence of air and noting the temperature of melting or fusion. Values obtained in this way are usually from 5 to 20° C. lower than those obtained by noting the temperature at which the polyamide melts when heated in a glass tube in the absence of oxygen. The melting points are considerably affected by the nature of the acid and the diamine used in their preparation. In particular melting points generally diminish with increasing unit length and increasing degree of substitution on the hydrocarbon chain. Increased solubility also runs in the same direction, but is not greatly affected by the molecular weight. In general the superpolyamides of this invention can be dissolved in hot glacial acetic acid, formic acid, or phenols. They are quite insoluble in most of the other usual types of organic solvents. In the finely divided state they are rapidly attacked by strong mineral acids such as strong hydrochloric or sulfuric acid and on heating with such acids they are hydrolyzed to the dibasic acids and diamides from which they are derived. They are resistant to attack by strong caustic alkalies but these agencies also will finally hydrolyze them to the diamines and dibasic acids.

The most obvious distinction between the low polymers and the superpolymers is that the former when molten are relatively much less viscous. The superpolymers even at temperatures 25° C. above their melting points are quite viscous. These superpolymers also dissolve more slowly than the low polymers and solution is preceded by swelling. As clearly mentioned, the superpolymers can be spun into continuous highly oriented filaments whereas the low polymers cannot. In general the low polymers can be converted into superpolymers by a continuation of the reaction by which the low polymers were formed or, for example, by further heating at higher temperatures under conditions that permit the rapid removal of any readily volatile products. The necessary conditions vary according to the particular case as is indicated in the discussion of various factors presented above, but in practice the conversion to superpolymer is easily tested for merely by touching the surface of the molten polymer with a rod and drawing the rod away. This is a very distinctive, sharp, and accurate test. If the superpolymeric stage has been reached, a continuous filament of considerable strength and pliability is readily formed. The length of the heat treatment necessary to obtain products of optimum utility for spinning must be determined for each polymer. If the heat treatment is continued after this optimum has been reached, inferior products are sometimes obtained.

A method of making the superpolyamides which will be found especially adapted to large scale manufacture is to heat the reactants in the presence of an organic liquid, such as a monohydric phenol, suitably m-cresol, which under the conditions of the process is a solvent for, and is chemically substantially non-reactive toward, both reactants and reaction product. This variation of my process is carried out generally by placing the amine and acid, together with the solvent, in a suitable reaction vessel. A preferred concentration is about one part of solvent to one of acid and amine combined, but other proportions may be used. The reaction mixture is heated and maintained at a definite temperature which will generally lie between 200 and 240° C. In general it is desirable to conduct the entire operation in the presence of an inert gas such as nitrogen and to promote completion of the reaction a stream of nitrogen, preheated if desired, may be passed continuously through the reaction mixture. The vessel is provided with an exit for vapor. When reaction sets in, water is liberated and distills from the reaction mixture. The viscosity of the reaction mixture increases and its electrical conductivity diminishes. With the aid of suitable devices (conductivity cells and viscometers), the change in these proporties can be measured continuously. The reaction will generally have progressed far enough to yield a product suitable for spinning (i. e. a superpolyamide) when the intrinsic viscosity has risen to at least 0.4. Intrinsic viscosity is defined as $$\frac{\log \eta_r}{C}$$

where $\eta_r$ is the viscosity of a dilute m-cresol solution of the polymer divided by the viscosity of m-cresol in the same units and at the same temperature and C is the concentration in grams of polymer per 100 cc. of solution. The test is conveniently made by withdrawing a test portion of the solution, precipitating the polymer in alcohol, dissolving the precipitated polymer in sufficient m-cresol to give a concentration of about 0.5%, and measuring the viscosity at 25° C. If the solvent used in the reaction is m-cresol, the precipitation step may be omitted. The final reaction mixture is homogeneous and at elevated temperatures sufficiently fluid to flow. It may be used directly for making fibers, as will be explained more fully hereinafter, but it is preferable first to separate the superpolymer from the solvent. This may be accomplished by distilling off the solvent, preferably under diminished pressure, or by pouring the mixture into a non-solvent for the superpolyamide which is capable of dissolving the solvent used in the reaction, such as alcohol, whereby the polymer is precipitated as a powder which can be filtered off, washed, and dried. It is then ready for being drawn into fibers in accordance with details to be described later.

In general it is desirable, if products capable of being formed into fibers of optimum quality are to be obtained, to prolong the heating beyond that point where the intrinsic viscosity has become 0.4. This period of subsequent heating will vary somewhat with the reactants but can be readily determined for any pair by drawing fibers from time to time and testing their strength. In general it may be stated that polymers having an intrinsic viscosity below 0.4 do not yield fibers of appreciable strength, the useful fiber-forming stage is reached at about the 0.4 level, and those superpolyamides having an intrinsic viscosity above 0.5 furnish fibers of very high strength. Products having an intrinsic viscosity between 0.5 and 2.0 are especially useful.

The superpolyamides of this invention appear to be crystalline and are capable of being spun into continuous filaments. In spinning such filaments, the superpolyamide may be dissolved in a suitable solvent and the solution extruded through orifices into a liquid which dissolves the solvent but not the superpolyamide, the resulting filament being continuously collected on a suitably revolving drum or spindle. The extruded solution may, alternatively, be passed through a heated chamber where the solvent is removed by evaporation. In spinning from solution by either method, the characteristics of the fibers may be altered by blending a solution of a cellulose derivative, such as nitrocellulose, cellulose acetate, ethyl cellulose, or other fiber-forming material, with the solution of superpolyamide.

The superpolyamides of this invention are of such extraordinary nature that they are also capable of being spun into continuous filaments directly from the molten mass without addition of any solvent or plasticizer. For this purpose a mass of the molten polymer may be touched with a rod. Upon drawing the rod away a filament is formed. The filament may be caught on a moving drum or reel and in this manner a continuous filament may be drawn from the molten mass until the latter is exhausted. The cross-section of the filaments thus obtained can be regulated by controlling the temperature of the molten mass and the rate of reeling. The higher the temperature and the more rapid the rate of reeling, the finer will be the filament.

Continuous filaments may also be produced by extruding the molten superpolyamide through an orifice, or through a spinneret containing a plurality of orifices, and continuously collecting the extruded filaments on a rotating drum. The fineness of the filaments may be controlled by controlling the temperature of the molten polymer, the amount of pressure applied, the size of the orifices, and the rate of reeling. The properties of the superpolyamides of this invention make it possible to obtain exceedingly fine filaments, as fine as 0.2 denier or less.

A remarkable characteristic of filaments of the superpolyamides of this invention is their ability to accept a very high degree of permanent orientation under stress. Filaments obtained by spinning the superpolyamides under such conditions that no stress is applied very closely resemble the superpolymer from which they are drawn. In particular, when examined by X-rays they generally furnish X-ray crystalline powder diffraction patterns, but if moderate stress is used in the spinning operation the filaments can be instantly elongated or cold-drawn at ordinary temperature as much as 200–700%. This cold-drawing (i. e., stretching below M. P. of filament) is accompanied by a progressive increase in tensile strength until a definite limit is reached beyond which the application of additional stress causes the fiber to break. The cold-drawn fibers remain permanently extended, they are much stronger than the material from which they are drawn, more pliable and elastic, and when examined by X-rays they furnish a sharp fiber diffraction pattern. They also exhibit strong birefringence and parallel extinction when observed under crossed Nicol prisms. This evidence of fiber orientation shows that the cold-drawn filaments are true fibers.

In practice, the formation of continuous oriented fibers from the filaments of this invention is easily conducted as an integral part of the spinning operation. Thus the extruded filaments as they are collected may be transferred continuously to a second drum driven at a higher rate of speed, so as to provide any desired degree of stretching or cold-drawing. Or friction devices may be inserted between the two drums to provide the necessary stretch. It may be observed that this process of cold-drawing differs from the stretch-spinning known to the artificial fiber art in that it may be carried out very rapidly and completely in the total absence of any solvent or plasticizer. However, the stretching can also be effected in the presence of solvent or plasticizer.

The synthetic fibers of the foregoing disclosure are unique in that the materials are synthesized from low molecular weight, monomeric, non-fibrous materials. This is quite different from the preparation of fibrous materials such as cellulose acetate, ethyl cellulose, etc., in which high molecular weight (polymeric) fibrous materials synthesized by nature are used as starting materials.

The properties of the fibers of this invention vary considerably with the nature of the reactants used in preparing the superpolyamides, and with the conditions of reaction and spinning. General characteristics illustrated in Example I are high tenacity, high orientation, complete lack of sensitivity toward conditions of humidity, exceptionally good elastic recovery, extraordinary resistance to solvents and chemical agents, and exceptionally good aging characteristics in air even at elevated temperatures. It is possible to tie hard knots in polyamide fibers without materially decreasing their tenacity. The fibers have a strong affinity for dyes; they can be dyed rapidly, permanently and directly, with the dyes ordinarily used for wool and silk. In general, fibers prepared from dibasic acid-stabilized polymers take up basic dyes more readily than those made from diamine-stabilized polymers, while the latter have a stronger affinity for acid dyes.

The following examples, in which the parts are given by weight, are illustrative of this invention.

EXAMPLE I

*Superpolyamide from pentamethylenediamine and sebacic acid by solvent method (unit length—17)*

A mixture of 14.8 parts of pentamethylenediamine, 29.3 parts of sebacic acid and 44 parts of mixed xylenols (B. P. 218–222° C.) was placed in a vessel fitted with a conductivity cell, a means for returning solvent lost by distillation, a means for introducing nitrogen, a thermometer, and a viscometer. The mixture was heated for 13 hours by means of the vapors of boiling naphthalene (218° C.), during which period the conductivity and viscosity were measured at appropriate intervals. The conductivity dropped rapidly and the viscosity rose steadily. At the end of 13 hours, the intrinsic viscosity was 0.62, and the conductivity had dropped from an initial value of 0.0028 mho to a final one of 0.000053 mho. At this point, examination of a small portion of the product, separated by precipitation in alcohol and subsequent fusion, showed that it could be drawn into fibers of excellent strength. The entire reaction mass was then poured gradually with stirring into a large volume of ethyl alcohol. The superpolyamide precipitated as a white granular powder, and was filtered, washed with alcohol, and dried. It melted at 195–196° C.

Analysis of the above product shows that it has the formula

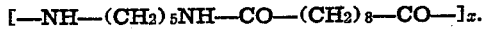

$$[-NH-(CH_2)_5NH-CO-(CH_2)_8-CO-]_x.$$

On hydrolysis with hydrochloric acid, it is converted to sebacic acid and pentamethylenediamine (hydrochloride).

Continuous filaments or fibers were prepared from the product as follows: A sample was heated at 234° C. in a cylindrical metal vessel surrounded by an electrically heated metal block and provided at the bottom with an orifice 0.47 mm. in diameter. The top of the vessel was connected with a tube through which nitrogen was passed under a gauge pressure of 3 lbs. The extruded filament was collected on a motor-driven drum having a peripheral speed of 82 feet per minute and was continuously transferred to and collected on a second drum having a peripheral speed of 164 feet per minute. The extent of the cold-drawing thus produced was 100%. The resulting fiber was lustrous and silky in appearance. It showed strong birefringence with parallel extinction under crossed Nicol prisms and when examined by X-rays it furnished a sharp fiber diffraction pattern, while the same material before spinning furnished only a crystalline powder diffraction pattern. When further stress was applied to these fibers cold-drawing occurred up to a total final length of 452%. Physical data on the completely cold-drawn fibers were: denier at break, 0.63; tensile at break, 50.5 kg./sq. mm. or 5.2 g. per denier. The elastic recovery of these fibers under moderate elongations or stresses was very remarkable and in this respect it was much superior to existing artificial silks. In their physical behavior these fibers are almost completely insensitive to moisture and indeed they show scarcely any tendency to absorb hygroscopic moisture. The fibers are completely resistant to the common organic solvents except such materials as hot acetic acid, formic acid or phenol, and they can for example be immersed in boiling toluene for a week without any noticeable effect. They are also very resistant to the effects of air and high temperature. They show no signs of tendering after storage for a month in air at 110° C. However, on heating with strong mineral acid, such as hydrochloric, hydrobromic, sulfuric, or phosphoric, these fibers disintegrate and are hydrolyzed to sebacic acid and pentamethylediamine (mineral acid salt).

Polypentamethylene sebacamide (intrinsic viscosity 0.67) prepared by heating purified pentamethylenediamine-sebacic acid salt for three hours under the conditions described above was spun into fibers (250% cold-drawing, applied in two stages) having a denier of 4.9 and a tenacity at break of 7.1 g. per denier. These fibers were plied into a 123-denier, 24-filament yarn having four twists per inch. This yarn was then knitted into a fabric and compared with a similar fabric knitted from 95-denier, 7-thread, 10-turn silk. The polyamide fabric was found to have far better elastic recovery than natural silk, particularly under conditions of high stretch (100%), high humidity (85%) or wet, and for long periods of time (15 hours). This is illustrated by Table III.

TABLE III

*Elastic recovery of knitted fabric*

| Percent stretched | Time held | Silk recovery | | Polyamide recovery | |
|---|---|---|---|---|---|
| | | 85% R. H. | Wet | 85% R. H. | Wet |
| 25 | 3 min. | 65 | | 77 | .79 |
| 35 | 3 min. | 58 | 43 | 71 | 79 |
| 45 | 3 min. | 48 | 38 | 76 | 79 |
| 75 | 3 min. | 24 | 34 | 73 | 80 |
| 100 | 3 min. | | 32 | 71 | 80 |
| 25 | 15 hrs. | 25 | | | |
| 50 | 15 hrs. | | | 53 | |

At the end of the above tests, (held three minutes), the silk fabric was drastically and permanently distorted while the polyamide fabric returned to essentially its former shape. Threads removed from the polyamide fabric also retained their crimped form much better than did the silk threads.

EXAMPLE II

*Superpolyamide from hexamethylenediamine and adipic acid (unit length—14) by solvent method*

A mixture of 26.4 parts hexamethylenediamine, 33.2 parts of adipic acid and 60 parts of mixed xylenols boiling 218–223° C. was placed in an apparatus of the type given in Example I. The mixture was heated for 7 hours by the vapors of boiling naphthalene. Conductivity and viscosity measurements were made at regular intervals. At the end of 5¾ hours, the conductivity had dropped to about 1/50th of its original value. After 7 hours, examination of the product in the manner given in Example I showed it to have excellent fiber-forming properties. The intrinsic viscosity at this point was 0.67, and the conductivity 0.000065 mho. The superpolymer was then precipitated in alcohol, and was found to melt at 248° C. Fibers spun therefrom and cold-drawn 100% had a denier at break of 0.63 and a tensile at break of 6.2 g. per denier. The wet strength of these filaments was approximately 90% of their dry strength. A fabric prepared from yarns plied from these filaments had elastic properties superior to silk. Both the superpolyamide and the fibers therefrom are hydrolyzed by strong mineral acid to hexamethylenediamine and adipic acid.

EXAMPLE III

*Superpolyamide from pentamethylenediamine and sebacic acid (unit length—17)*

(a) Chemically equivalent amounts of sebacic acid and pentamethylenediamine were heated at 200° C. at atmospheric pressure in a glass vessel provided with a reflux condenser. The condenser was then removed to permit the distillation of water and heating was continued at 230–240° C. for 6 hours while a slow stream of nitrogen was passed over the surface of the mixture. The resulting superpolymeric pentamethylene sebacamide was readily spun into continuous fibers of good strength.

(b) Chemically equivalent amounts of pentamethylenediamine and sebacic acid were heated for 2 hours at 220–240° C. in a closed vessel. The low polymer thus obtained was heated for one hour at 230–240° C. under a pressure of 1 mm. The superpolymeric pentamethylene sebacamide thus obtained readily yielded continuous filaments of good strength. On further heating for one hour at the same pressure and temperature the superpolymer yielded fibers of still higher strength.

(c) Chemically equivalent amounts of sebacic acid and pentamethylenediamine were heated at 230–240° C. for 2 hours in a closed glass vessel. The vessel was then opened to permit the removal of water by distillation and heating was continued for one hour. The resulting superpolymer readily yielded fibers of good strength.

(d) Twenty-eight and nine-tenths parts of sebacic acid and 15.4 parts (5% excess) of pentamethylenediamine were heated for 2 hours in a closed glass vessel at 220–230° C. The vessel was then evacuated and heating was continued for 2 hours more at 220–230° C. at 1 mm. The resulting superpolyamide readily gave fibers of exceptional strength and pliability. The polymer showed no tendency to increase in viscosity when heated at melt spinning temperatures.

This superpolyamide was spun and cold-drawn into a fiber as in Example I. The temperature of the melt was 215–220° C.; the spinning rate (peripheral speed of first drum) was 70 ft. a minute, and the rate of cold-drawing (peripheral speed of the second drum) was 225 ft. a minute. Complete cold-drawing of the filament involved a total extension of 444%. The resulting silk-like fiber had a denier at break of 0.65 and a tenacity of 3.38 g. per denier or 33 kg. per mm.$^2$ A sample of fiber having a denier of 1.1 prepared from the same superpolyamide was dried by heating at 110° C. for 16 hours and immediately weighed. It was then stored at 25° C. at 50% relative humidity for 5 hours and again weighed. The weights were 1.1184 g. and 1.1272 g., respectively, indicating that the fibers had absorbed 0.79% moisture. Viscose rayon fibers stored under comparable conditions absorbed about 8% moisture. The polyamide also had a higher ratio of wet to dry strength than the rayon.

(e) Five parts of pentamethylenediamine and 10.39 parts (5% excess) of sebacic acid were heated for two hours in a closed glass vessel at 230–240° C. The vessel was then evacuated and heating was continued further for one hour at a pressure of 1 mm. of mercury. The resulting superpolyamide was "viscosity stable" and was readily spun into continuous fibers that showed good strength.

(f) Chemically equivalent amounts of sebacic acid and pentamethylenediamine together with about 0.1% stannous chloride were heated in a closed glass vessel for 2 hours at 230–240° C. The vessel was then opened to permit the removal of water by distillation and heating was continued at atmospheric pressure for one hour. The resulting superpolyamide gave fibers that showed good strength.

EXAMPLE IV

*Superpolyamide from decamethylenediamine and adipic acid (unit length—18)*

A mixture of 31.8 parts of decamethylene diammonium adipate (the diamine-dibasic acid salt, M. P. 142–143° C.), 0.365 part (2.5% excess) of adipic acid and 60 parts of white medicinal oil was heated at 175° C. for 0.5 hour and then at 250° C. for 1.5 hours under conditions which permitted the water formed in the reaction to distill. Both the salt and the superpolymer formed therefrom were insoluble in the oil. The superpolyamide was white in color, had a melting point of 230° C., and an intrinsic viscosity of 0.76. On spinning it yielded oriented fibers of good strength.

EXAMPLE V

*Superpolyamide from p-xylylenediamine and sebacic acid (unit length—18)*

A solution of 35 parts of p-xylylenediamine-sebacic acid salt (M. P. 210–212° C.) and 40 parts of m-cresol was heated for 5 hours at 215° C. under the conditions described in Example I. The superpolyamide thus formed was precipitated in the form of a fluffy white solid by pouring the solution into a mixture of ethyl acetate and alcohol. After washing with hot alcohol and drying, the polymer had a melting point of 267–269° C. and an intrinsic viscosity of 0.63. It yielded oriented fibers.

EXAMPLE VI

*Superpolyamide from pentamethylenediamine and butyl carbonate (unit length—8)*

A mixture of 7.55 parts of pentamethylenediamine and 12.9 parts of di-n-butyl carbonate (chemically equivalent proportions) was heated in the presence of 20 parts of m-cresol for 4 hours at 215° C. About 9 parts butyl alcohol distilled, this being about 80% of the theoretical amount. The cresol was then distilled off in vacuo, together with some material which partly solidified in the receiver. The residue was heated for 1½ hours at 235° C. at a pressure of 1 mm. The superpolyamide obtained was a light brown opaque solid which melted sharply at 211–212° C. It was readily spinnable into fibers of good quality.

EXAMPLE VII

*Superpolyamide from hexamethylenediamine and dicresyl adipate (unit length—14)*

A mixture consisting of 150 parts of dicresyl adipate, 54 parts hexamethylenediamine and 100 parts of m-cresol was placed in a reaction vessel which was evacuated, sealed, and heated at 235° C. for three hours. When the vessel was opened, the reaction product was found to consist of an almost colorless, viscous mass. It was poured gradually into a large volume of ethyl alcohol whereupon the superpolyamide precipitated in the form of a fine white powder. This material had an intrinsic viscosity of 0.63 and yielded continuous oriented fibers of good quality. If the cresol is omitted from the original reaction mixtures, the superpolyamide obtained is a colorless, rather hard mass. It may be purified by grinding and washing with alcohol, after which its intrinsic viscosity is 0.54. Fibers of good quality can be drawn from it.

EXAMPLE VIII

*Superpolyamide from hexamethylene diammonium adipate (unit length—14)*

A salt was prepared from hexamethylenediamine and adipic acid as follows: 144 parts of the amine was mixed with 174 parts of the acid in the presence of 1300 parts of 95% ethyl alcohol and 210 parts of water and the mass warmed until complete solution occurred. The mixture was then cooled and the pure white crystals which separated out were filtered off and recrystallized from 1300 parts of 95% alcohol and 200 parts of water. The recrystallized material consisted of 247 parts. It melted at 183–184° C. and had the composition required for hexamethylene diammonium adipate. It was converted into superpolyamide by heating for three hours with an equal weight of mixed xylenol under the conditions described in Example I. The conductivity of the mixture fell from 0.0022 to 0.0000215 mho and the absolute viscosity increased from 0.14 to 20.4 poise. The precipitated polymer had an intrinsic viscosity of 1.2. It could be spun into oriented fibers from melt or from solution. Fibers prepared from melt at 284–292° C. under 50 pounds' pressure using a spinneret having ten orifices each 0.0078 inch in diameter and placed at the bottom of 0.125 inch cone-shaped protrusions extending downward from the face of the spinneret, and cold-drawn 240% had a denier at break of 1.08 and a tenacity at break of 4.32 g. per denier. A 113-denier, 70-filament, 4-twist per inch yarn made from fibers of this polymer could readily be knitted into fabrics of excellent properties.

EXAMPLE IX

*Superpolyamide from hexamethylene diammonium adipate (unit length—14)*

A mixture of two mols of hexamethylene diammonium adipate and 0.02 mol of adipic acid was placed in a two-liter, silver-lined autoclave equipped with an 18:8 stainless steel (i. e., 18% chromium, 8% nickel, and less than 0.7% carbon) stirrer and an 18:8 stainless steel steam-cooled reflux condenser, the top of which was connected through a water-cooled downward condenser to a receiver. Air was removed from the autoclave by evacuation, followed by filling with nitrogen and evacuating again. A nitrogen pressure of 80 pounds was then applied. The nitrogen used for this purpose was commercial nitrogen which had been washed with sodium hydrosulfite "silver salt" solution to remove substantially the last traces of oxygen. The stirrer was started and the autoclave heated to 288° C. during 1.5 hours. The pressure was then reduced to atmospheric during 0.5 hour and the heating and stirring continued for 2.5 hours. After cooling the polymer was removed from the autoclave as a white solid cake. It had an intrinsic viscosity of about 0.9 and yielded good fibers on spinning from melt using a constant volume delivery pump of the type used in viscose spinning (Zenith Gear Pump, type A–1).

It will be seen from the foregoing that the recurring structural units of my superpolyamides may be represented by the general formula ... N(a)—G'—N(a')—G''— ... in which a and a' are hydrogen or monovalent hydrocarbon radicals, G' is a divalent hydrocarbon radical and G'' is a divalent acyl radical. The most easily prepared superpolyamides in this broad field are those having structural units of the general type ... NH—G'—NH—G'' ... in which G' and G'' are defined as above, the sum of the radical lengths of G'' and NH—G'—NH being at least 9. A particularly valuable group of superpolyamides from the standpoint of fiber-forming qualities are those having structural recurring units which may be represented by the general formula

... NHCH₂RCH₂NHCOCH₂R'CH₂CO ...

in which R and R' are divalent hydrocarbon radicals of the types already described. It will be noted that all of the superpolyamides in the foregoing examples with the exception of Example VI are of this type. It will be noted further that the polyamides of Examples I–IV, VII, VIII, and IX have recurring structural units of the general type

... NHCH₂(CH₂)ₓCH₂NHCOCH₂(CH₂)ᵧCH₂CO ...

in which x and y are integers and in which x is at least two. Superpolyamides of this select class are readily spun and give fibers of excellent quality. On hydrolysis with hot mineral acids, the superpolymers of this invention yield the acids and diamines (as mineral acid salts) from which they were derived.

It can be readily seen from the above examples that the important feature of the process of this invention is that the diamine and dibasic acid or amide-forming derivative, or the low molecular weight non-fiber-forming polyamide therefrom, must eventually be reacted or further reacted under conditions which permit the formation of a very highly condensed polyamide. In other words, the heating must be continued at such a temperature and for such a period of time that the product can be drawn into oriented fibers, and this point is reached essentially only when the intrinsic viscosity has risen to at least 0.4. In the preparation of some of my new superpolyamides, it may be advantageous to apply the principles of molecular distillation described in my Patent 2,071,250.

It will be evident that the present invention describes a wholly new and very valuable type of synthetic fiber, and is therefore an outstanding contribution to this art because the new fibers are the first useful ones ever made by a wholly synthetic process and because they have unusual properties, being strong, flexible, elastic, non-hygroscopic, etc. to a remarkable degree. The fact that they show by X-ray diffraction patterns orientation along the fiber axis (a characteristic of natural fibers and fibers derived from high molecular weight natural substances) places them in the field of true fibers.

It will be apparent that the superpolyamides described herein are most useful in the form of fibers. Many other valuable artificially shaped objects may, however, be prepared from them, such as films, foils, sheets, ribbons, bands, and molded objects. The products may also be used in the preparation of coating, adhesive, sizing and impregnating compositions. They may be used alone or in admixture with other ingredients, such as cellulose derivatives, resins, plasticizers, pigments, dyes, etc.

As many apparently widely different embodiments of this invention may be made without departing from the spirit and scope thereof, it is to be understood that I do not limit myself to the specific embodiments thereof except as defined by the appended claims.

I claim:

1. A process which comprises heating at polyamide-forming temperatures approximately equimolecular proportions of tetramethylenediamine and a member of the class consisting of adipic acid and amide-forming derivatives of adipic acid and continuing such heating until a polymer is produced which is capable of yielding continuous filaments that can be tied into hard knots.

2. A process which comprises bringing together approximately equimolecular proportions of tetramethylenediamine and a member of the class consisting of adipic acid and amide-forming derivatives of adipic acid, and heating the mixture at polyamide-forming temperatures in the substantial absence of oxygen and with removal of the by-product of reaction until the polymer formed is capable of being spun into filaments which can be cold drawn into fibers showing by characteristic X-ray diffraction patterns orientation along the fiber axis.

3. A process which comprises contacting tetramethylenediamine with adipic acid, isolating the salt thereby formed, and heating the salt at polyamide-forming temperatures with removal of water of reaction until a polymer is produced which has an intrinsic viscosity of at least 0.4.

4. A polymer capable of being drawn into continuous filaments which can be formed into fabrics, said polymer yielding upon hydrolysis with hydrochloric acid a mixture of substances comprising tetramethylenediamine hydrochloride and adipic acid.

5. A synthetic linear polyamide capable of being formed into fibers showing by characteristic X-ray patterns orientation along the fiber axis, said polyamide being polymeric tetramethylene adipamide.

6. An artificial filament comprising polymeric tetramethylene adipamide.

7. A composition of matter comprising a cellulose derivative and a fiber-forming linear polyamide obtainable from a diamine in which the amino groups are attached to aliphatic carbon atoms and in which each amino nitrogen bears at least one hydrogen atom, and a dibasic carboxylic acid in which the carboxylic groups are attached to aliphatic carbon atoms.

8. A composition of matter comprising a cellulose derivative and polymeric tetramethylene adipamide.

9. An artificial filament comprising a cellulose derivative and a fiber-forming linear polyamide obtainable from a diamine in which the amino groups are attached to aliphatic carbon atoms and in which each amino nitrogen bears at least one hydrogen atom, and a dibasic carboxylic acid in which the carboxylic groups are attached to aliphatic carbon atoms.

10. An artificial filament comprising a cellulose derivative and polymeric tetramethylene adipamide.

WALLACE H. CAROTHERS.

Certificate of Correction

Patent No. 2,190,770.   February 20, 1940.

WALLACE H. CAROTHERS

It is hereby certified that errors appear in the printed specification of the above numbered patent requiring correction as follows: Page 3, second column, line 31, for the word "ends" read *tends*; page 5, first column, line 66, for "diamides" read *diamines*; and second column, line 3, for the word "clearly" read *already*; line 10, for "temperatures" read *temperature*; line 62, for $$\text{``}\frac{\log \eta_\gamma}{C}\text{''} \quad \text{read} \quad \frac{\log_e \eta_\gamma}{C}$$

page 9, second column, line 12, in the formula, for "NH—G'—NH—G''''" read *NH—G'—NH—G''—*; and that the said Letters Patent should be read with these corrections therein that the same may conform to the record of the case in the Patent Office.

Signed and sealed this 23rd day of April, A. D. 1940.

[SEAL]

HENRY VAN ARSDALE,
*Acting Commissioner of Patents.*